United States Patent
Chen

(10) Patent No.: US 7,929,297 B2
(45) Date of Patent: Apr. 19, 2011

(54) ACCESSORY STRAP FIXING STRUCTURE AND PORTABLE ELECTRONIC DEVICE HAVING THE SAME

(75) Inventor: Chien-Chih Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 140 days.

(21) Appl. No.: 12/494,468

(22) Filed: Jun. 30, 2009

(65) Prior Publication Data

US 2010/0014246 A1     Jan. 21, 2010

(30) Foreign Application Priority Data

Jul. 21, 2008   (CN) .......................... 2008 1 0302871

(51) Int. Cl.
    *G06F 1/16*         (2006.01)

(52) U.S. Cl. ................ 361/679.56; 455/575.3; 310/215; 416/230; 600/205

(58) Field of Classification Search ............... 455/575.1, 455/575.3, 347; 396/423, 36, 352; 361/679.01, 361/679.21, 679.55, 679.56, 679.27, 679.34; 410/100, 113, 106; 600/300, 301, 443, 454, 231, 205, 233; 416/134 A, 230, 168 R, 141; 310/71, 262, 68 R, 214, 215, 87, 226, 261.1; 100/26, 8, 32, 17

See application file for complete search history.

(56) References Cited

U.S. PATENT DOCUMENTS

| | | | |
|---|---|---|---|
| 4,243,350 A * | 1/1981 | Hall ............................... | 410/100 |
| 2008/0219657 A1* | 9/2008 | Suzuki et al. ................. | 396/423 |
| 2010/0035666 A1* | 2/2010 | Chang et al. ............... | 455/575.1 |
| 2010/0118476 A1* | 5/2010 | Li ............................ | 361/679.01 |

* cited by examiner

*Primary Examiner* — Hung V Duong
(74) *Attorney, Agent, or Firm* — Steven M. Reiss

(57) ABSTRACT

An accessory strap fixing structure is disposed on a portable electronic device to assemble a accessory strap. The accessory strap fixing structure includes an assembling slot and a rotor. The assembling slot is recessed on the portable electronic device. The rotor is rotatably assembled within the assembling slot and divides the assembling slot into two opening portions to assemble the accessory strap. The invention also discloses a portable electronic device having the accessory strap fixing structure.

14 Claims, 3 Drawing Sheets

ACCESSORY STRAP FIXING STRUCTURE AND PORTABLE ELECTRONIC DEVICE HAVING THE SAME

BACKGROUND

1. Technical Field

The disclosure generally relates to an accessory strap fixing structure and a portable electronic device having the same.

2. Description of Related Art

With the development of technologies, portable electronic devices such as mobile phones, MP3s, digital cameras and personal digital assistants (PDAs) are now in widespread use, and consumers may now enjoy the full convenience of high technology products almost anytime and anywhere.

The conventional portable electronic device usually has an accessory strap fixing structure disposed thereon to assemble the accessory strap. However, the dimension of the existing accessory strap fixing structure is small and it is hard to assemble the accessory strap with the existing accessory strap fixing structure.

Therefore, there is room for improvement within the art.

BRIEF DESCRIPTION OF THE DRAWINGS

Many aspects of the present accessory strap fixing structure and portable electronic device having the same can be better understood with reference to the following drawings. The components in the drawings are not necessarily drawn to scale, the emphasis instead being placed upon clearly illustrating the principles of the present accessory strap fixing structure and portable electronic device having the same. Moreover, in the drawings, like reference numerals designate corresponding parts throughout the several views.

DETAILED DESCRIPTION

Figure 1:
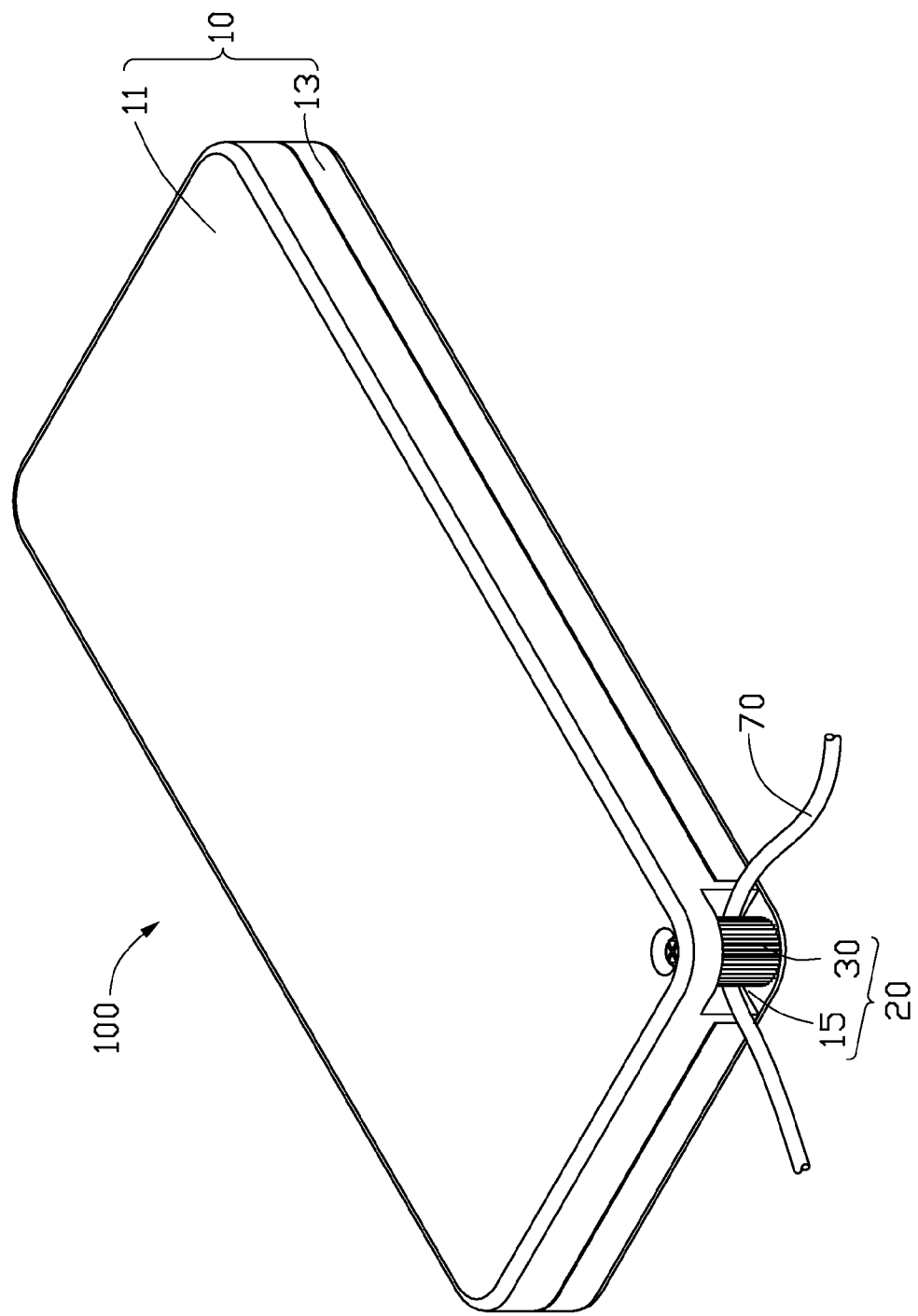
FIG. 1 shows a perspective view of a portable electronic device having an accessory strap assembled therewith in accordance with an exemplary embodiment of the present invention.

Please referring to FIG. 1, a portable electronic device 100 includes a main body 10 and an accessory strap fixing structure 20 disposed thereon to assemble an accessory strap 70 (only part shown) thereof. The main body 10 may be a mobile phone, an MP3, a digital camera or a personal digital assistant (PDA), etc. The accessory strap fixing structure 20 includes an assembling slot 15 recessed on the main body 10 and a rotor 30 rotatably assembled within the assembling slot 15. The rotor 30 divides the assembling slot 15 into two opening portions communicating with each other, so as to assemble the accessory strap 70.

Figure 2:
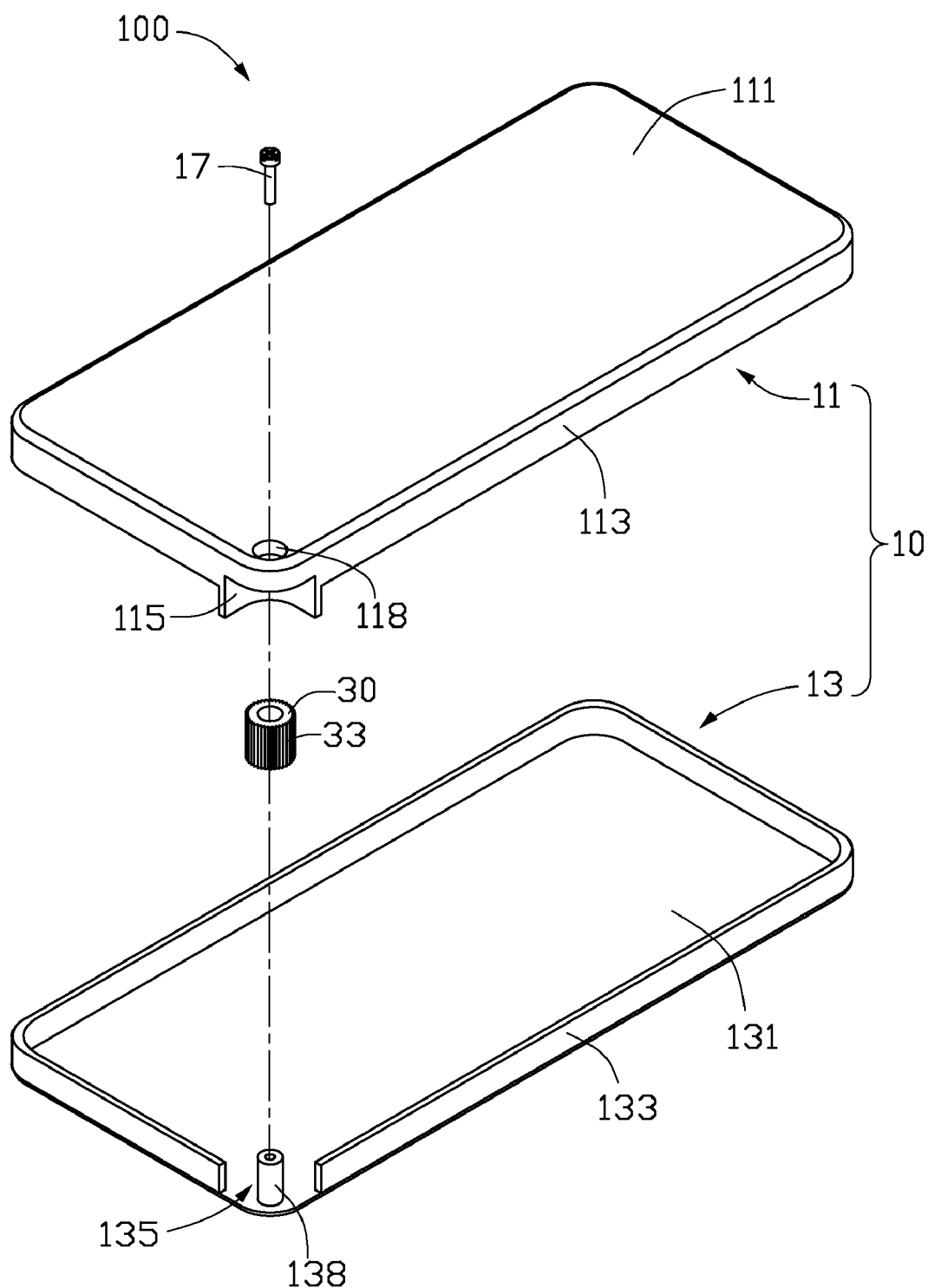
FIG. 2 shows an exploded perspective view of the portable electronic device shown in FIG. 1.
Figure 3:
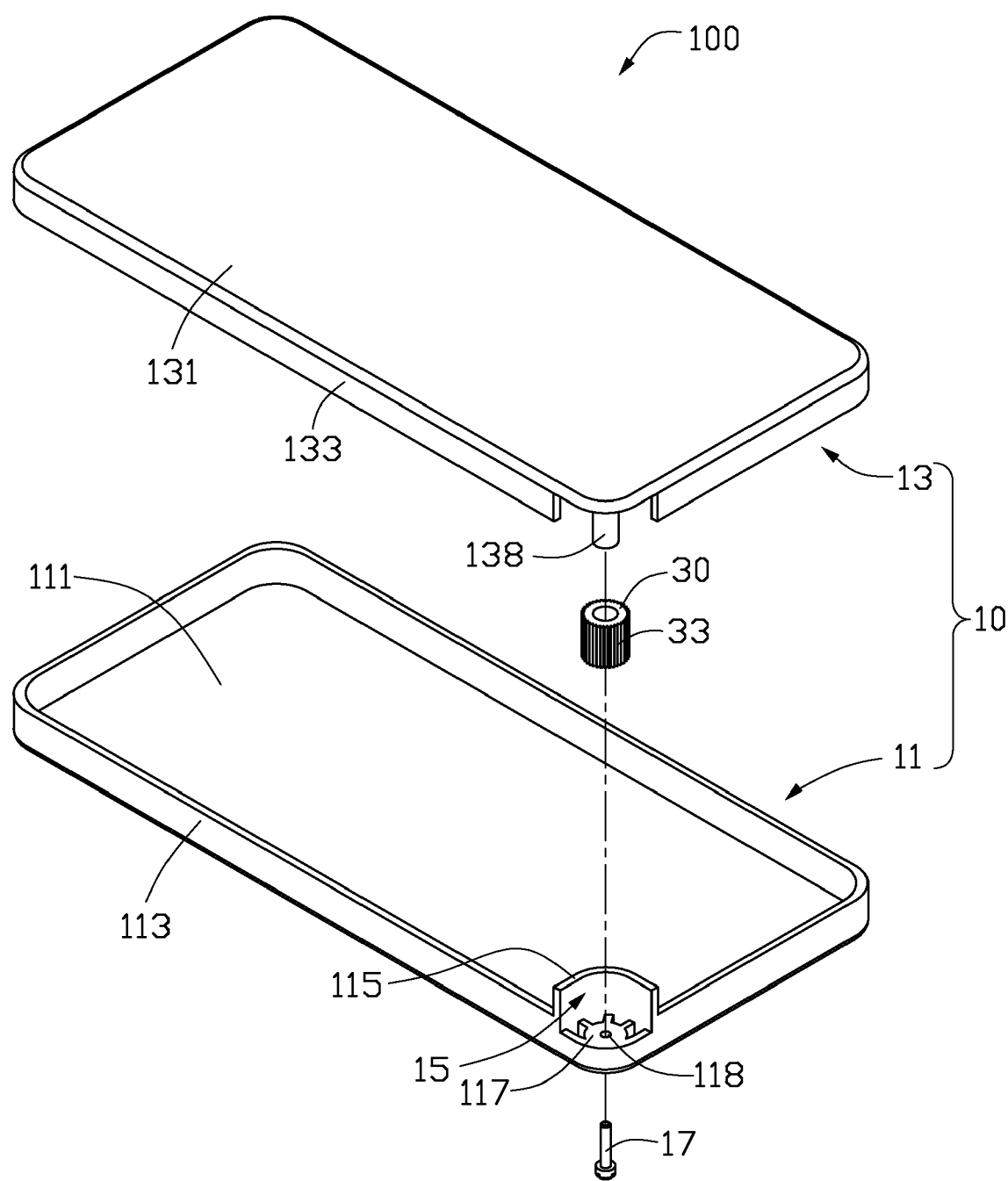
FIG. 3 is similar to FIG. 2, but viewed from another aspect.

Referring to FIGS. 2 and 3, in the exemplary embodiment, the main body 10 includes an upper shell 11, a lower shell 13 and a fastener 17. The upper shell 11 includes an upper wall 111 and a sidewall 113 extending from peripheral edge of the upper wall 111. The side wall 113 has a assembling slot 15 recessed thereon adjacent to one corner thereof. The assembling slot 15 includes an arcuate guiding wall 115 and an assembling bottom wall 117 parallel to the upper wall 111. The arcuate guiding wall 115 is perpendicular to the upper wall 111. The assembling bottom wall 117 has a through hole 118 defined therethrough from the upper wall 111 side for assembling the fastener 17.

The lower shell 13 is detachably assembled with the upper shell 11. The lower shell 13 includes a bottom wall 131 and a sidewall 133 extending from peripheral edge of the bottom wall 131. The side wall 133 defines an opening 135 therethrough adjacent to one corner thereof and corresponding to the assembling slot 15 of the upper shell 11. The bottom wall 131 includes a cylindrical hollow column 138 protruding therefrom perpendicularly adjacent to the opening 135 corresponding to the assembling slot 15 of the upper shell 11.

The fastener 17 may be a bolt and is used to fixed the upper shell 11 with the lower shell 13. The rotor 30 is a substantially cylindrical hollow gear and includes a plurality of teeth spaced apart disposed at the peripheral wall thereof.

In assembly, the rotor 30 is rotatably positioned over the column 138 of the lower shell 13, the upper shell 11 is mounted to the lower shell 13, the guiding wall 115 of the upper shell 11 and the opening 135 of the lower shell 13 cooperatively form the assembling slot 15 to accommodate the column 138 and the rotor 30. The rotor 30 divides the assembling slot 15 into two opening portions communicating with each other, so as to assemble the accessory strap 70. The fastener 17 penetrates through the assembling through hole 118 of the upper shell 11, the rotor 30 and is fixedly screwed with the column 138 of the lower shell 13.

When assembling the accessory strap 70, one end the accessory strap 70 is inserted into one of the two opening portions of the assembling slot 15 and contacts with the peripheral wall of the rotor 30. As the strap 70 is inserted and contacts the teeth of rotor 30, rotor 30 rotates to assist the accessory strap 70 in penetrating through the two opening portions of the assembling slot 15 along the guiding wall 115 and be exposed from the other opening portion of the assembling slot 15. It is easy to operate and assemble the accessory strap 70 quickly and conveniently.

It is to be understood, however, that even though numerous characteristics and advantages of the present invention have been set forth in the foregoing description, with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. An accessory strap fixing structure disposed on a portable electronic device to assemble an accessory strap thereon, the accessory strap fixing structure comprising:
    an assembling slot recessed in the portable electronic device; and
    a rotor rotatably assembled within the assembling slot;
    wherein the rotor divides the assembling slot into two communicating portions for inserting the accessory strap therethrough.

2. The accessory strap fixing structure as claimed in claim 1, wherein the assembling slot includes a cylindrical column disposed within the assembling slot, the rotor is rotatably assembled on the column.

3. The accessory strap fixing structure as claimed in claim 2, wherein the rotor is a gear including a plurality of teeth on a peripheral wall of the gear.

4. The accessory strap fixing structure as claimed in claim 1, wherein the portable electronic device may be a mobile phone, an MP3, a digital camera or a personal digital assistant.

5. The accessory strap fixing structure as claimed in claim 1, wherein the portable electronic device includes a side wall, the assembling slot is recessed in the side wall adjacent to a corner of the sidewall.

6. A portable electronic device comprising:
a main body; and
an accessory strap fixing structure disposed on the main body to assemble a accessory strap; the accessory strap fixing structure comprising:
an assembling slot recessed in the main body; and
a rotor rotatably assembled within the assembling slot;
wherein the rotor divides the assembling slot into two communicating portions for inserting the accessory strap therethrough.

7. The portable electronic device as claimed in claim 6, wherein the assembling slot includes a cylindrical column disposed within the assembling slot, the rotor is rotatably assembled on the column.

8. The portable electronic device as claimed in claim 7, wherein the rotor is a gear including a plurality of teeth on a peripheral wall of the gear.

9. The portable electronic device as claimed in claim 6, wherein the portable electronic device may be a mobile phone, an MP3, a digital camera or a personal digital assistant.

10. The portable electronic device as claimed in claim 6, wherein the main body includes a side wall, the assembling slot is recessed in the side wall adjacent to a corner of the sidewall.

11. The portable electronic device as claimed in claim 6, wherein the main body includes an upper shell and a lower shell detachably assembled with the upper shell, the upper shell includes an upper wall and a sidewall extending from peripheral edge of the upper wall; the assembling slot recessed in the side wall adjacent to a corner of the sidewall.

12. The portable electronic device as claimed in claim 11, wherein the assembling slot includes an arcuate guiding wall and an assembling bottom wall parallel to the upper wall; the lower shell includes a bottom wall, a sidewall; the side wall of the lower shell defines an opening therethrough corresponding to the assembling slot of the upper shell; the guiding wall and the opening form the assembling slot together accommodate the rotor therein.

13. The portable electronic device as claimed in claim 12, wherein the bottom wall includes a cylindrical hollow column protruding therefrom perpendicularly adjacent to the opening and accommodated within the assembling slot of the upper shell, the rotor is rotatably mounted on the column.

14. The portable electronic device as claimed in claim 13, wherein the assembling bottom wall defines a through hole therethrough, the main body further includes a fastener, the fastener penetrates through the assembling through hole, the rotor and is fixedly screwed within the column of the lower shell.

\* \* \* \* \*